J. T. GREELEY.
CLINICAL THERMOMETER CASING.
APPLICATION FILED AUG. 18, 1913.
1,152,503.
Patented Sept. 7, 1915.
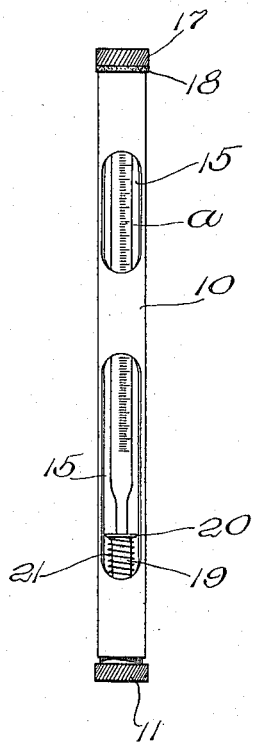
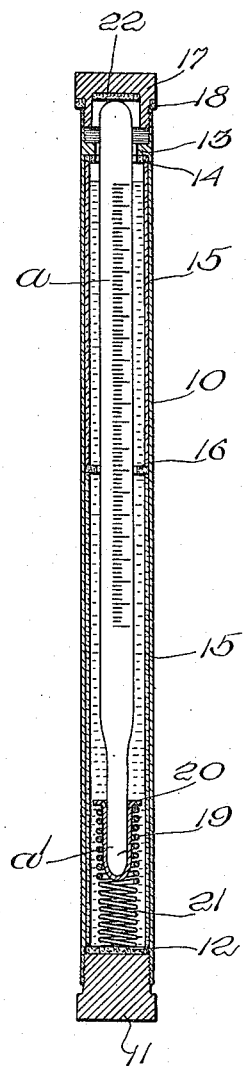
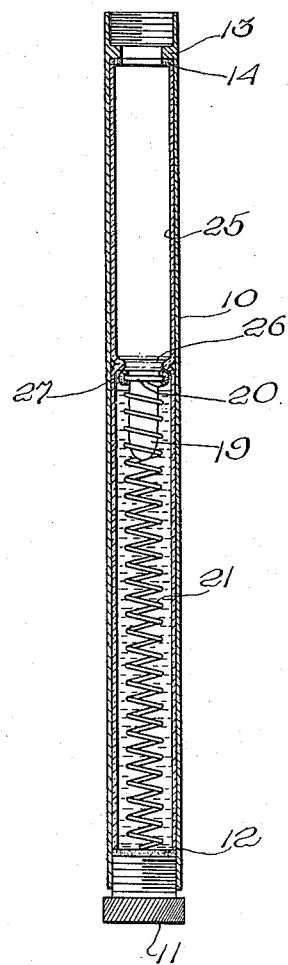
Witnesses:
E. P. Brannen
P. W. Pezzetti
Inventor:
James T. Greeley,
by Wright Brown Quimby May
Attorneys.

UNITED STATES PATENT OFFICE.

JAMES T. GREELEY, OF NASHUA, NEW HAMPSHIRE.

CLINICAL-THERMOMETER CASING.

1,152,503.  Specification of Letters Patent.  Patented Sept. 7, 1915.

Application filed August 18, 1913. Serial No. 785,220.

*To all whom it may concern:*

Be it known that I, JAMES T. GREELEY, a citizen of the United States, of Nashua, in the county of Hillsboro and State of New Hampshire, have invented certain new and useful Improvements in Clinical-Thermometer Casings, of which the following is a specification.

This invention relates to means for insuring the cleanliness of thermometers of the type usually carried by physicians and which are called clinical thermometers, the same being employed for taking the temperature of patients by inserting the bulb end of the thermometer in the mouth of the patient. The mouth and adjoining surfaces furnish an ideal breeding place for most disease-producing organisms. It is, of course, desirable that there will be no possibility of transmission of such organisms from one patient to another, due to the use of the same thermometer for different patients. It is highly desirable that the thermometer shall be surgically clean. Sterilizing by heat is impracticable, and cold water is inefficient. To employ a sterilizing solution in the casing in which the thermometer is carried by the physician, necessitates to render the device practicable, that means shall be provided for retaining the sterilizing solution in the casing when the thermometer is removed.

The object of my invention is to provide a practical and effective casing for thermometers of the kind explained, which will automatically sterilize the thermometer before and after use, and from which the liquid cannot accidentally escape.

To these ends the invention consists in the improvements which I shall now proceed to describe and claim.

Of the accompanying drawings,—Figure 1 is a side elevation of my invention in one of its embodiments. Fig. 2 represents a longitudinal section on a larger scale. Fig. 3 is a view similar to Fig. 2, the thermometer being removed from the casing, said figure illustrating a slight modification hereinafter described.

Referring first to Figs. 1 and 2, the casing comprises an outer shell 10, which is preferably of metal, provided with openings to enable the contained thermometer to be seen, and the amount of liquid to be visually determined. A bottom plug 11 having a screw-thread connection with the lower end of the shell 10, has a suitable packing, such as a disk 12. Near the other end, the shell is formed or provided with an internal rib 13, against the under surface of which a packing washer 14 bears. The inner member of the casing, as shown in Fig. 2, comprises two glass tubes 15, 15, end to end, with an intermediate packing ring or washer 16, which ring as hereinafter explained, performs also the function of a valve-seat. A top plug 17, and a suitable packing-washer 18, serves to removably close the upper end of the casing. The packing 16 practically divides the interior of the casing into two chambers, due to the coöperation with said ring 16 of a valve preferably having a cup-shaped portion 19, to receive the tip $a'$ of the thermometer $a$, the upper end of the cup-shaped portion or body 19 being outwardly turned to form a flange 20. A fine, delicate spring 21 surrounds the cup-shaped portion 19 of the valve, and is confined between the flange 20 and the bottom of the casing presented by the bottom plug and the packing 12. The interior of the plug 17 may be provided with a suitable cushion, 22.

Owing to the valve having the cup-shaped portion 19 substantially as illustrated, the tip $a'$ of the thermometer fits therein in such manner that when the thermometer is being pushed into the casing, the thermometer itself is guided centrally because the tip cannot be deflected laterally to any material amount. This structure also results in the thermometer itself guiding or holding the valve so that the latter cannot tilt, and therefore the annular portion 20 can be of small enough diameter to leave a considerable space around it for the passage of the liquid when the valve is being shifted in either direction by the thermometer or by the spring. In brief, there is a very free passage for the liquid, and yet there is no liability of the valve tilting so as to either result in jamming the valve or thermometer or letting them slip past each other.

When the thermometer is in the casing, as indicated in Fig. 2, the tip $a'$ holds the valve down near the bottom of the casing, so that a suitable quantity of sterilizing liquid, such as grain alcohol in the casing, can pass freely from one chamber of the casing to the other. The quantity of liquid employed is preferably such that when the thermometer is inserted in the casing, the lower portion of the thermometer displaces the liquid to such extent that said liquid will extend to, or nearly to the upper end of the upper chamber, thus submerging the thermometer, or at least, all such portion of it as will ever be introduced into the mouth of a patient, in a sterilizing liquid. When the thermometer is to be used, the plug 17 is removed, and the spring 21 instantly projects the thermometer sufficiently so that its upper end can be conveniently grasped by the physician. The spring may, or may not act to raise the thermometer until the flange 20 seats against the ring 16, but it will be of such strength, at least, that when the physician entirely withdraws the thermometer, the valve will be seated, and absolutely confine all of the liquid remaining in the lower chamber, so that the casing can be safely laid upon its side, or even inverted, without loss of the sterilizing liquid from the lower chamber.

The withdrawal of the thermometer positively insures the movement of all liquid in the upper chamber into the lower chamber, this being due to what is commonly called suction, the effect being caused by atmospheric pressure seeking to fill the partial vacuum that would be caused by the removal of the lower portion of the thermometer from the lower casing.

In Fig. 3, the valve is shown as seated, the thermometer having been removed. In said Fig. 3, I illustrate the inner casing member as comprising a single glass tube 25, integral from end to end, instead of comprising two sections, as in Fig. 2. With such a structure a suitable internal rib 26 is formed during the manufacture of the tube 25, and the necessary packing to effect a tight closure may be formed by means of a washer 27, fitted over the flange 20, the packing in this case, moving with the valve. Obviously, however, the packing 27 could be fitted to remain just underneath the rib 26.

Obviously, the casing may be readily supplied with the necessary quantity of liquid, by simply pouring such liquid into the open upper end of the casing while the thermometer, or any suitable rod, is inserted sufficiently to separate the valve, more or less, from its seat, and the casing may be emptied in the same manner, that is, by holding the valve more or less open, while the casing is inverted.

The spring 21 not only insures the seating of the valve to prevent the escape of liquid when the thermomenter is withdrawn, but it also serves to render it certain that the thermometer will be sufficiently ejected, upon the removal of the plug 17, to enable the thermometer to be removed, and said spring also serves to so yieldingly confine the thermometer endwise when in the position shown in Fig. 2, to greatly reduce the liability of breakage, if the casing and its thermometer should be suddenly jarred or dropped.

I do not limit myself to the particular relative proportions of the upper and lower chambers indicated in the drawings. The upper chamber may be relatively considerably shorter. A particular feature of my invention, however, is that when the thermometer is removed, the movement of all liquid into the lower chamber, behind or below the valve, is rendered positive by atmospheric pressure. When the thermometer is in the casing, however, the valve is removed from its seat so that the sterilizing liquid may flow freely from one chamber to the other, so that the thermometer is bathed from end to end in a harmless antiseptic. The confining of the liquid in the lower chamber when the thermometer is removed, reliably prevents spilling or evaporation of said liquid.

The cup 19 more or less loosely surrounds the tip of the thermometer so that it receives a small quantity of the liquid each time that the thermometer is inserted. When the valve closes and the thermometer is removed, the liquid contained in the cup either evaporates or flows out into the outer portion of the tube, so that it does not return to the main body of liquid. Provision is therefore made for gradually decreasing the quantity of stored liquid, this decrease rendering it incumbent on the user to renew the supply by adding fresh clean liquid from time to time. Without this provision the liquid would eventually become excessively contaminated.

I claim:

1. A thermometer casing comprising an outer shell having side openings, two glass tubes confined in said shell, a packing between said tubes, said packing extending inwardly to form a valve seat, a valve and an actuating spring therefor located in one of said tubes, said valve having an annular portion to co-act with the valve seat portion of said packing to confine a sterilizing liquid, and a removable closure to confine a thermometer in said casing.

2. A thermometer casing comprising an outer metal shell having side openings, said shell having a closing plug at one end and an internal rib near the other end, a transparent tubular container within the shell having a valve seat intermediate its ends, packing between one end of the tubular container and the said internal rib and packing between the other end of the container and said closing plug, a valve to coöperate with said seat, and an actuating spring located between said valve and the closing plug, a removable closure being provided for the end of the shell above the internal rib.

3. A thermometer casing having an annular valve seat intermediate its ends, a valve having an annular portion formed to bear on said seat, and an elongated cylindrical cup-shaped portion the mouth of which is surrounded by the annular portion, and a spring surrounding the cup-shaped portion and confined between the annular portion and the lower end of the casing, said cup-shaped portion being of sufficient depth and diameter to receive and guide the tip of a thermometer, and to remove liquid from the portion of the casing below the valve seat, substantially as and for the purpose specified.

In testimony whereof I have affixed my signature, in presence of two witnesses.

JAMES T. GREELEY.

Witnesses:
A. W. HARRISON,
P. W. PEZZETTI.

Copies of this patent may be obtained for five cents each, by addressing the "Commissioner of Patents, Washington, D. C."